Figure 1:
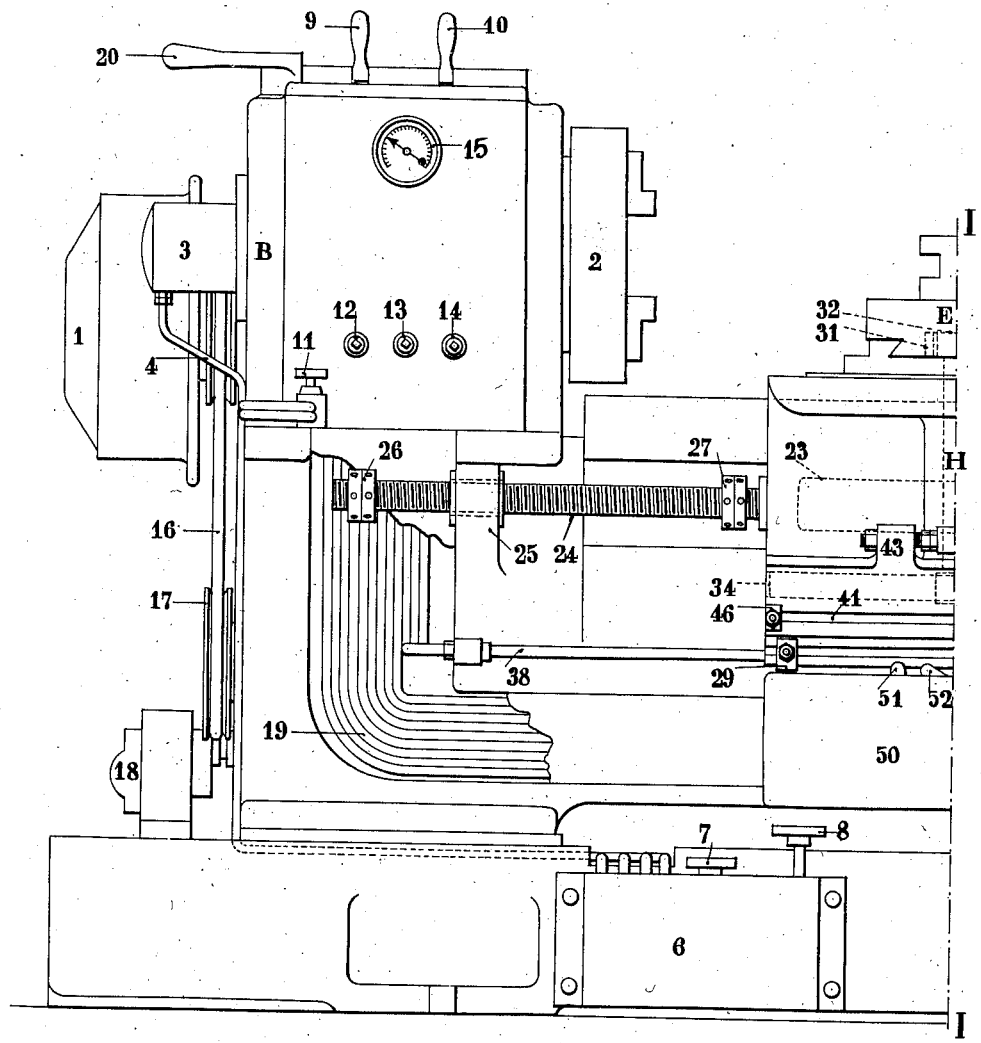

Dec. 15, 1931.  G. CUTTAT  1,836,648
DEVICE FOR AUTOMATICALLY CONTROLLING THE
SLIDE RESTS OF LATHES AND MACHINE TOOLS
Filed July 17, 1928  6 Sheets-Sheet 1

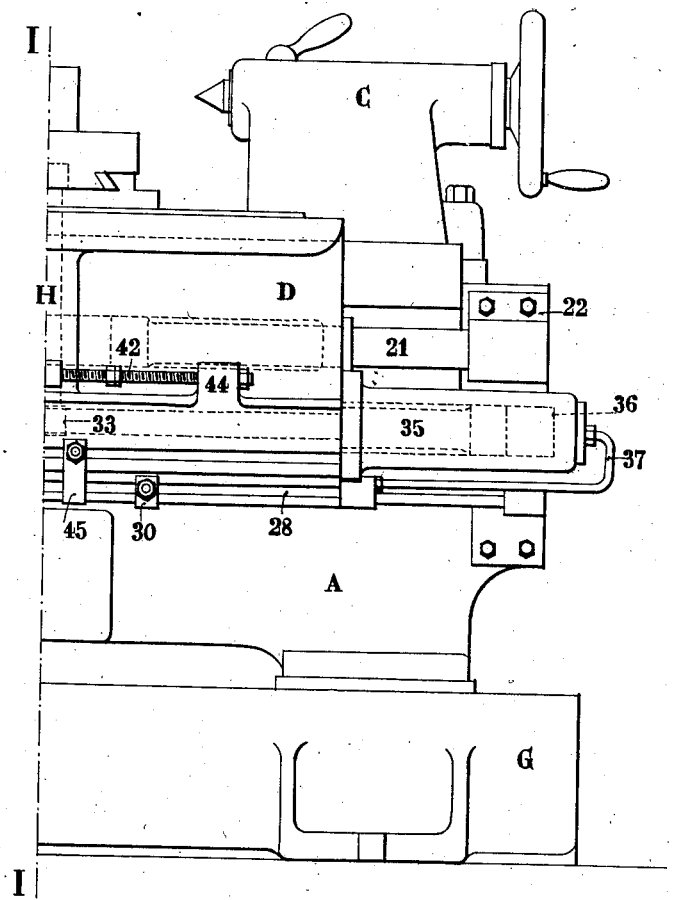

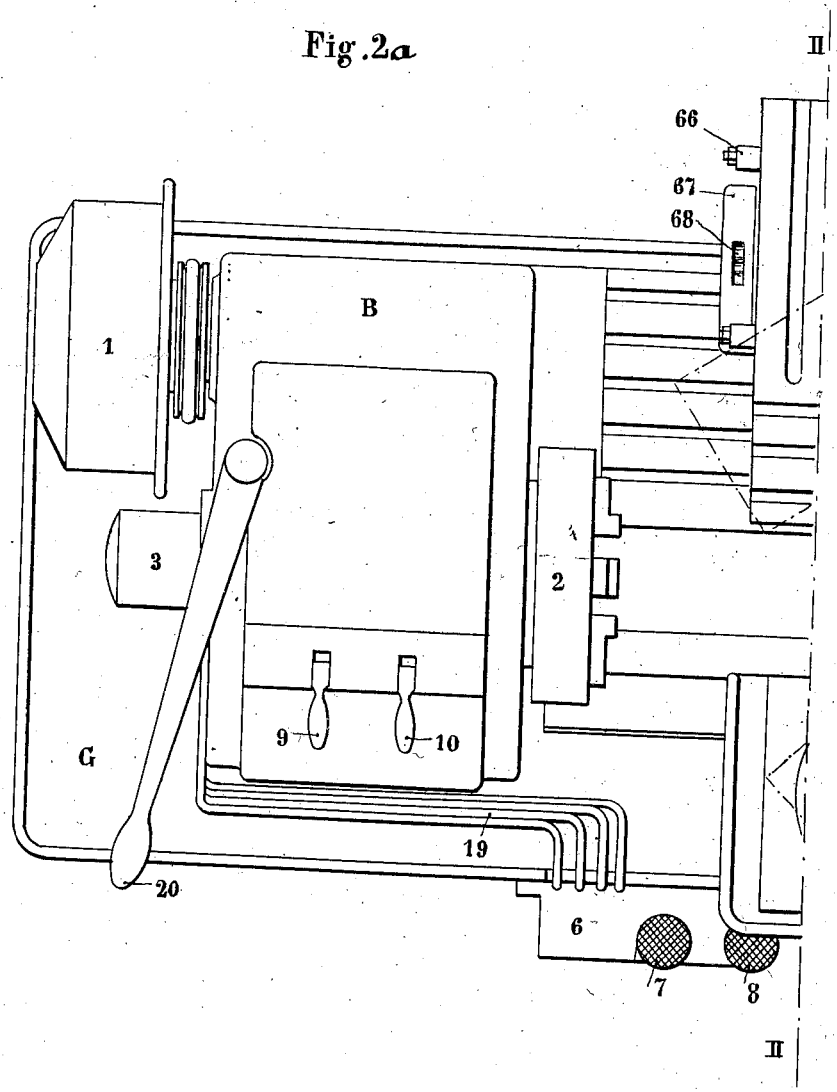

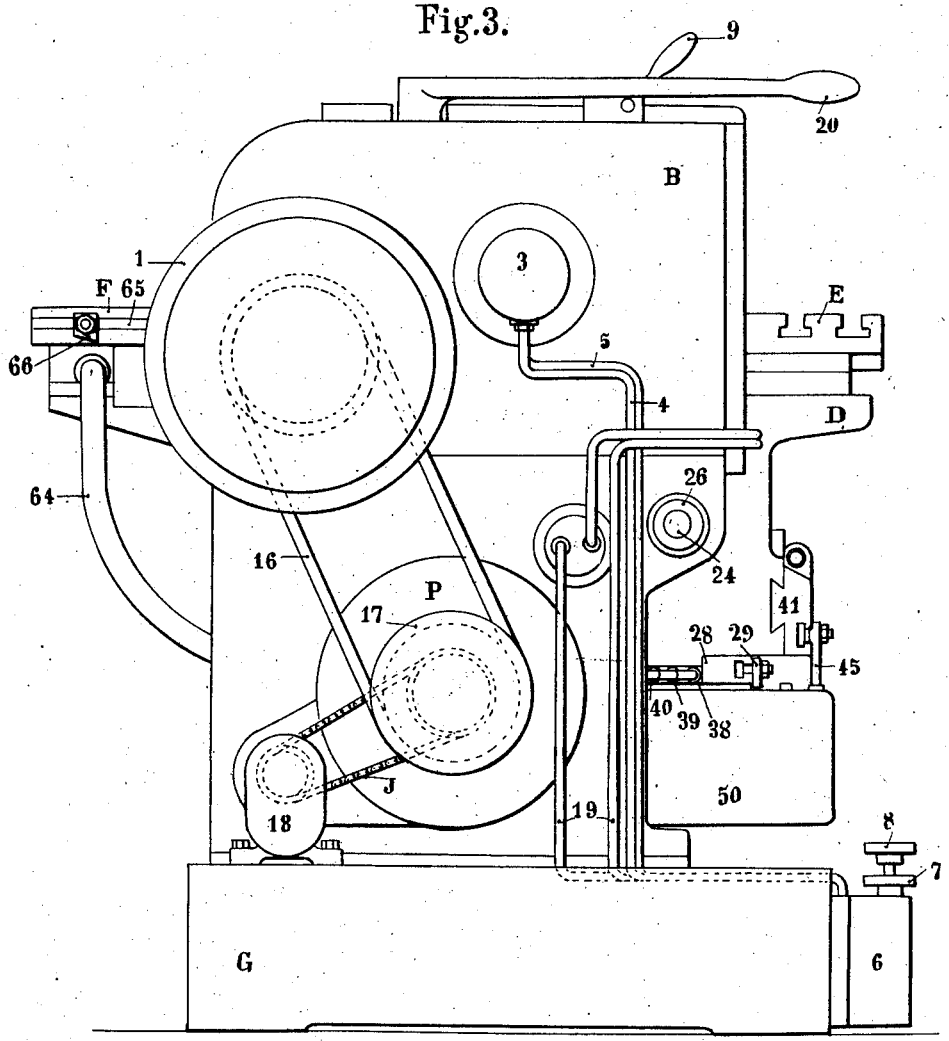

Dec. 15, 1931.

G. CUTTAT 1,836,648

DEVICE FOR AUTOMATICALLY CONTROLLING THE
SLIDE RESTS OF LATHES AND MACHINE TOOLS

Filed July 17, 1928   6 Sheets-Sheet 6

G. Cuttat
INVENTOR

By: Marks & Clerk
ATTYS.

Patented Dec. 15, 1931

1,836,648

UNITED STATES PATENT OFFICE

GEORGES CUTTAT, OF PARIS, FRANCE, ASSIGNOR TO SOCIETE ANONYME DES ETABLISSEMENTS CUTTAT, OF PARIS, FRANCE

DEVICE FOR AUTOMATICALLY CONTROLLING THE SLIDE RESTS OF LATHES AND MACHINE TOOLS

Application filed July 17, 1928, Serial No. 293,406, and in France March 29, 1928.

This invention has for object a mechanical device for controlling the slide rests of lathes and automatic machine tools in general. The device is more particularly adapted to be applied to hydraulically actuated machines and will be described accordingly, but it can operate, without essential transformation, by the use of another driving agent, for instance, a pneumatic or electrical agent.

In its most simple form of construction which is described by way of example, in order to clearly point out its principle, this device automatically ensures the control of the movements of two slide rests, the directions and working of which are independent from each other. One of these slide rests (called, hereinafter, second slide rest) is movable on the other (first slide rest) itself movable relatively to the common frame which supports them.

The device forming the subject-matter of the present invention is essentially characterized by the fact that the movements of the said slide rests themselves have for result—whatever may be the direction of these movements—to create, in the movable system which controls them, a movement always parallel to a fixed direction, which is, generally, the axis of the frame supporting the slide rests.

In other words, the two groups of movable parts which, alternately, ensure partially or totally the momentary admission and suppression of the driving agent of the two slide rests, (compressed fluid, for instance), are dawn along at the same time as the slide rests themselves, either directly by the latter or by intermediary parts drawing along the said slide rests; their movement is parallel to a fixed direction, which can be the axis of the frame supporting the slide rests.

According to the same principle, the movements instead of being rectilinear can be circular, the center of the trajectories then being the same for the two groups of movable driving parts, connected respectively to each of the slide rests.

The simplified device, considered by way of example comprises two elements, viz:

1. A first slide rest capable of moving on a slide-block integral with the frame which supports it; on this slide rest can be secured, at suitable points and either directly or on an auxiliary member integral with the said slide rest, one or more tappets which are adapted to automatically control the various movements of the system described.

2. A second slide rest, arranged on the first one and capable of moving either parallel or perpendicularly, relatively to the path of the first slide rest, or according to any intermediary direction, but always in the same plane, these various lines of displacement of the second slide rest being, moreover, all in the same plane; this second slide rest is connected by a system composed of two racks and two pinions (the latter angularly integral with each other), to a slide-block capable of moving parallel or concentrically to the tappet-carrying member described in paragraph 1; one or more tappets capable of being secured at suitably chosen points of this slide-block, having functions similar to those of the tappets described in paragraph 1; this slide-block (second tappet-carrying member) directly receives from the device controlling the advance of the second slide rest, the energy which enables it to move, the displacement of the second slide rest being, moreover, ensured by the above-mentioned system of pinions and racks.

These principles of automatic control set forth in the case of two slide rests, for the purpose of simplification, can be applied without any changes in the case of a number of slide rests superior to two, as will be easily understood by the following.

Whatever may be the slide rest in motion, the tappet-carrying member on which depends this slide rest, always moves in a direction parallel to that of the tappet-carrying member of the other slide rest. In these conditions, each slide rest can control either a change of speed of its own movement or the starting of the other slide rest, or a variation of speed of this latter.

The device forming the subject-matter of the present invention is illustrated in the accompanying drawings as an example of construction and without any limiting character, as applied to an automatic lathe hydraulically actuated.

Figure 2:
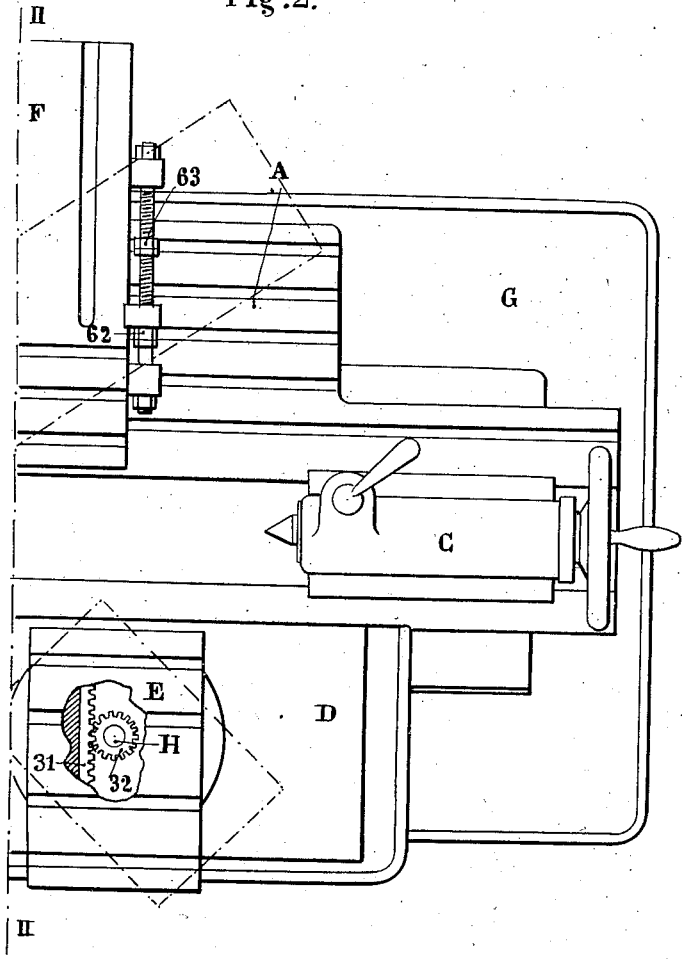
Figure 4:
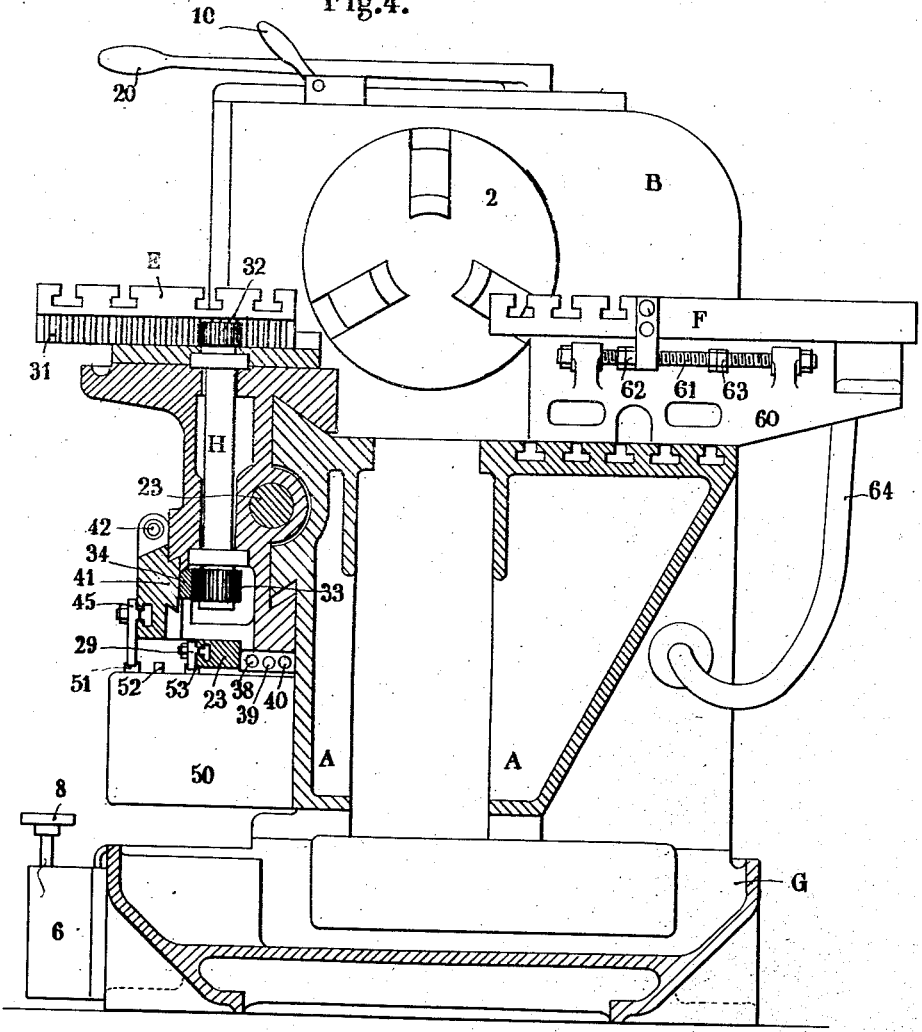
Figure 5:
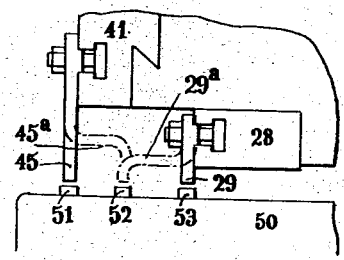

Fig. 1 is a front view of the machine.
Fig. 2 is a plan view with parts in section.
Fig. 3 is an end view from the side where is located the puppet of the lathe.
Fig. 4 is a cross section made through the axis of the slide rests.
Fig. 5 illustrates one of the shapes which can be given to the tappets controlling the automatic movements.

It will be noted that in the drawings in addition to the device according to the invention (slide rests D and E) is illustrated another device constituted by a simple slide rest F (third slide rest); this slide rest F can be, just as well and without departing thereby from the principle of the invention, replaced by a second device similar to that forming the object of the present application; that is to say, similar to the combination of the slide rests D and E; these combinations can be applied to a machine in any number whatever; their relative shapes and arrangements can vary according to the requirements of the operations to be effected.

In the drawings:
A is the frame of the lathe.
B is the hand stock of this lathe; 1 is its driving pulley, 2 is a chuck; 3 a hydraulic cylinder for tightening the jaws of this chuck; 4—5 the pipe lines feeding this cylinder; 6 the box containing the hydraulic control valve of the chuck; 7 and 8 the pedals for opening and closing the said valve; 9 and 10 are the starting and return handles of the slide rests; 11 is a by-pass valve for controlling the pressure; 12, 13, 14 are individual hydraulic adjusting hand wheels for the various parts driven by this means; 15 is a pressure gauge for controlling the pressure; 16 a belt which drives, by means of the pulley 17, a hydraulic compressor P (Fig. 3); 18 is a gear pump or any other system, for sprinkling the member or part being machined, J (Fig. 3) is the chain which drives the said pump; 19 the system of pipe lines for the admission and the exhaust of the fluid under pressure to and from the various parts; 20 is a lever adapted to actuate the clutch device between the pulley 1 and the spindle of the lathe; C is the tail stock of this lathe; D illustrates the first slide rest which can move longitudinally on the frame A.

21 is the rod of the hydraulic piston which controls this displacement; it is secured to the frame A by the member 22; 23 is the hydraulic cylinder in which moves the said piston; in the example shown, this cylinder is integral with the slide rest D; 24 is a screw which moves with the slide rest D and on which can be screwed nuts 26 and 27 allowing to regulate the stroke of the slide rest D, by the abutment of these nuts against the member 25 integral with the frame A.

28 is a sliding member integral with the slide rest D; 29 and 30 are tappets which may be secured at any point whatever of this sliding member.

E is the second slide rest mounted on the first slide rest D and capable of pivoting on the latter so as to itself be capable of moving either parallel or perpendicularly to the said first slide rest, according to the same plane, or again in any intermediary position between these latter.

31 is a rack integral with the slide rest E; 32 a pinion in engagement with this rack; 33 a pinion angularly integral with the pinion 32 to which it is connected by the shaft H; 34 is a rack in engagement with the pinion 33; 35 is the rod of the hydraulic piston which, axially connected to the rack 34, transmits to the latter the movement of the said piston, which moves in the cylinder 36; 37 is one of the pipe lines feeding this cylinder 36; 38 (Fig. 1) and 39—40 (Fig. 3) are telescopic pipe lines allowing the feeding of the cylinder 36 during its longitudinal displacement; 41 is a slide-block integral with the rack 34, to which it is axially connected, and capable of moving with this rack owing to the action of the piston 35; this slide-block 41 then moves parallel to the slide-block 28 of the slide rest D.

42—43—44 illustrate a system of screws and abutments similar to that previously described for the first slide rest D, and adapted to limit the movement of the second slide rest E. 45 and 46 are tappets capable of being secured at a point suitably chosen, of the slide-block 41, according to the work to be effected.

50 illustrates a box receiving the pipe lines 19 and containing the valves controlling the pistons 21 and 35; 51—52 (Figs. 1, 4 and 5) and 53 (Figs. 4 and 5) are finger pieces which actuate these valves which are themselves controlled by the tappets 29—30—45 and 46.

F is an auxiliary slide rest, before mentioned "third slide rest", secured on the frame A and capable of taking relatively to the axis of this frame either a perpendicular or parallel position, according to the same plane, or any other intermediary position; this slide rest of ordinary and well-known type, is illustrated herein, only by way of example; it can be replaced, as stated, by a device according to the combination D, E.

This slide rest F is actuated by hydraulic piston and cylinder; it carries a slide-block 65 provided with a movable tappet 66 controlling the valve 67 by means of the finger 68 (Fig. 2); as this slide rest F moves, upon regulating, its feeding is ensured by a group of flexible tubes which, in the example shown, pass into a common sheath 64 (Figs. 3 and 4).

The hydraulic equipment of the system may be of any type whatever; it may for instance correspond to the arrangements described in the United States patent application Serial No. 293,405 by the same applicant for "Device for automatically controlling hydraulic cylinders with automatically variable speeds and stresses for machine tools and the like"; likewise, the operation of the slide rests may, as previously stated and without departing from the scope of the invention, be pneumatically or electrically produced (in this latter case, the tappets would actuate relays) or by any other suitable device.

Fig. 5 shows a device by means of which the tappets 29, 30 and 45, 46, secured at suitable points on the slide blocks 28 and 41, can control three different valves by acting on the valve fingers 51, 52, 53; the valve 52 being the middle valve, the tappets which control it will be in the shape shown at $45^a$ or $29^a$.

In order that the invention may be clearly understood, it will be assumed that in the case presently described:

(a) The tappet 51 controls the stoppage of the slide rest E; the tappet 52 controls the starting of the slide rest E; the tappet 53 controls the stoppage and starting of the slide rest D.

(b) The slide rests occupy their starting positions; the slide rest D towards the tail stock C and the slide rest E at its extreme point of backward movement.

It will be assumed that the pressure is admitted in the cylinder 23. In these conditions, the slide rest D moves forward towards the puppet B until one of the tappets secured on the slide-block 28 comes in contact with the finger 53, at this moment the slide rest D stops; a tappet secured on the slide-block 41 (which moves at the same time as 28) can come in contact with the finger 52 and the slide rest E starts in its turn; the slide-block 41 which then moves independently of 28 but parallel to the latter can carry a tappet which, at the required and predetermined moment, comes in engagement with the finger 53, this causing the new starting of the slide rest D; at this moment, moreover, the slide rest E can stop by the action of another tappet coming in contact with the finger 51.

These combinations of movements may be indefinitely varied by modifying their sequence and their duration; in fact, whatever may be the element (slide rest) in action, the slide-block from which depends this element always moves in a direction parallel to that of the other slide-block. Consequently, the valve fingers may be independently controlled by one or the other of these slide-blocks. In these conditions, whatever may be the slide rest in motion this slide rest can control either a variation of speed of its own movement, or the starting of the other slide rest, or a variation of speed of the latter. Such is the very advantageous result which characterizes the invention.

Likewise, the number of these slide-blocks may be increased if deemed necessary, according to the applications and without departing from the scope of the invention.

Moreover, slide-blocks of circular shape may be used instead of the rectilinear slide-blocks described.

Furthermore, on one or the other of the sliding members, or on both, may be provided a tappet controlling a finger which will ensure at the end of the operation the automatic return of the slide rests to their starting points.

Other tappets may also be provided, which tappets, when the slide rests will have been brought back to their starting points, will control a finger ensuring the restarting of these slide rests.

By the action of these various factors, it will be possible to automatically obtain all the movements necessary for executing a given work, that is to say the movements such as starting, rapid feed, slow feed, restarting, rapid return to starting point, etc.

The invention may therefore be carried out according to many different ways which all come within the scope of the invention if they include its principle, so that it results from the explanations of the beginning and of the description of the particular form of construction given by way of example.

Claims:—

1. An automatic lathe of the type described, hydraulically actuated, and comprising a frame, a hydraulic compressor, pipe lines for supplying to and evacuating the fluid under pressure from the various members, a hydraulic cylinder, a first carriage rigid with the said hydraulic cylinder, a sliding member rigid with the said carriage, tappets movable on this slide, a second carriage capable of pivoting, then of moving on the first carriage, a first rack rigid with the second carriage a first pinion in engagement with the said rack, a second pinion angularly rigid with the first one, a second rack in engagement with this second pinion, a second hydraulic cylinder longitudinally movable and the piston of which is connected to the second rack, telescopic pipe lines feeding the second hydraulic cylinder, a second slide rigid with the second rack and moving parallel to the first slide, tappets movable on the second slide, means for limiting and regulating the respective displacements of both carriages, valves controlling the said operating pistons, fingers controlled by both series of tappets and actuating the said valves.

2. An automatic lathe of the type described, hydraulically actuated, and comprising a frame, a hydraulic compressor, pipe lines for supplying to and evacuating the fluid under pressure from the various members, a hydraulic cylinder, a first carriage rigid with the said hydraulic cylinder, a sliding member rigid with the said carriage, tappets movable on this slide, a second carriage capable of pivoting, then of moving on the first carriage, a first rack rigid with the second carriage a first pinion in engagement with the said rack, a second pinion angularly rigid with the first one, a second rack in engagement with this second pinion, a second hydraulic cylinder longitudinally movable and the piston of which is connected to the second rack, telescopic pipe lines feeding the second hydraulic cylinder, a second slide rigid with the second rack and moving parallel to the first slide, tappets movable on the second slide, means for limiting and regulating the respective displacements of both carriages, valves controlling the said operating pistons, fingers controlled by both series of tappets and actuating the said valves, a third carriage secured on the first one but capable of taking any position relatively to the frame, a hydraulic cylinder and piston actuating this third carriage, a slide with a movable tappet controlling the displacements of this third carriage.

3. A device for controlling the movements of carriages of machine tools and the like, comprising a frame, a first carriage movable on the said frame, a second carriage movable in any direction on the first carriage, a first group of movable tappets carried along according to a trajectory fixed by the displacement of the first carriage, a second group of movable tappets carried along according to a trajectory parallel to the first by the displacement of the second carriage, separate driving means for the respective carriages, control members situated on the said trajectories and actuated alternately to the movement of the movable tappets of either of the two groups, connections between the said members and the driving means thus permitting the starting and the momentary partial stoppage of the driving means of the two carriages.

4. A device for controlling the movements of carriages of machine tools and the like comprising a frame, a first carriage movable on the said frame, a second carriage movable in any direction on the first carriage, a first group of movable tappets carried along according to a fixed rectilinear direction by the displacement of the first carriage, a second group of movable tappets carried along according to a rectilinear direction parallel to the first by the displacement of the second carriage, separate driving means for the respective carriages, members situated on the said rectilinear directions and actuated alternately to the movement of the movable tappets of either of the two groups, connections between the said members and the driving means permitting the starting and momentary partial stoppage of the driving means of the first and the second carriage.

5. An automatic lathe of the described type actuated by a fluid under pressure and comprising a frame, pipe lines for supplying and evacuating the fluid under pressure from the various members, a cylinder receiving the said fluid, a first carriage integral with the said cylinder, a sliding member integral with the said carriage, tappets displaceable on the said slide, a second carriage capable of pivoting and then being displaced on the first carriage, a first rack integral with the said carriage, a first pinion engaging with the said rack, a second pinion angularly integral with the first pinion, a second rack engaging with the second pinion, a second cylinder receiving the fluid under pressure and movable longitudinally, a connection between the piston of the second cylinder and the second rack, telescopic pipe lines feeding the second cylinder, a second slide integral with the second rack and adapted to be displaced parallel to the first slide, tappets displaceable on the second slide, means for limiting and regulating the respective courses of the two carriages, valves controlling the said operating pistons, fingers controlled by the two series of tappets and actuating the said valves.

6. An automatic lathe of the described type actuated by a fluid under pressure and comprising a frame, pipe lines for supplying and evacuating the fluid under pressure from the various members, a cylinder receiving the said fluid, a first carriage integral with the said cylinder, a sliding member integral with the said carriage, tappets displaceable on the said slide, a second carriage capable of pivoting and then being displaced on the first carriage, a first rack integral with the said carriage, a first pinion engaging with the said rack, a second pinion angularly integral with the first pinion, a second rack engaging with the second pinion, a second cylinder receiving the fluid under pressure and movable longitudinally, a connection between the piston of the second cylinder and the second rack, telescopic pipe lines feeding the second cylinder, a second slide integral with the second rack and adapted to be displaced parallel to the first slide, tappets displaceable on the second slide, means for limiting and regulating the respective courses of the two carriages, valves controlling the said operating pistons, fingers controlled by the two series of tappets and actuating the said valves, a third carriage fixed on the frame but adapted to occupy any position relative to the latter, a cylinder and piston receiving the energy of the fluid under pressure and actuating the third carriage, a slide with movable tappet controlling the displacements of the third carriage.

7. A device for controlling the movements of carriages of machine tools and the like comprising a frame, a first carriage movable on the said frame, a second carriage arranged on the first and adapted to move according to any direction relative to the course of the first carriage, a slide displaceable in a direction parallel to the course of the first carriage, two groups of tappets in an adjustable position on the said slide, a system of pinions and racks establishing a kinematic connection between the movements of the second carriage and those of the slide, a driving medium, members situated on the trajectory of the slide and actuated by the movement of the tappets of either of the two groups, connections between the said members and those permitting the starting and momentary partial stoppage of the driving medium on the two carriages.

The foregoing specification of my "Device for automatically controlling the slide rests of lathes and machine tools" signed by me this 6th day of July, 1928.

GEORGES CUTTAT.